US011686045B2

(12) United States Patent
Takamori et al.

(10) Patent No.: US 11,686,045 B2
(45) Date of Patent: Jun. 27, 2023

(54) SHOE PRESS BELT AND METHOD FOR PRODUCING A SHOE PRESS BELT

(71) Applicant: Ichikawa Co., Ltd., Tokyo (JP)

(72) Inventors: Yuya Takamori, Tokyo (JP); Manami Morinaga, Tokyo (JP)

(73) Assignee: Ichikawa Co., Ltd., Tokyo (JP)

(*) Notice: Subject to any disclaimer, the term of this patent is extended or adjusted under 35 U.S.C. 154(b) by 198 days.

(21) Appl. No.: 17/178,322

(22) Filed: Feb. 18, 2021

(65) Prior Publication Data

US 2021/0269977 A1 Sep. 2, 2021

(30) Foreign Application Priority Data

Feb. 28, 2020 (JP) ................................ 2020-033891

(51) Int. Cl.
*D21F 3/02* (2006.01)
*C08G 18/10* (2006.01)
(Continued)

(52) U.S. Cl.
CPC ........... *D21F 3/0236* (2013.01); *C08G 18/10* (2013.01); *C08G 18/44* (2013.01);
(Continued)

(58) Field of Classification Search
CPC ...... D21F 3/0236; D21F 3/086; D21F 3/0227; C08G 18/10; C08G 18/44; C08G 18/4854; C08G 18/7671; C08G 18/3206
See application file for complete search history.

(56) References Cited

U.S. PATENT DOCUMENTS

| 10,196,777 B2* | 2/2019 | Umehara ............... D21F 3/0227 |
| 2006/0191658 A1* | 8/2006 | Watanabe ............... C08G 18/10 |
| | | 162/358.4 |

(Continued)

FOREIGN PATENT DOCUMENTS

| EP | 1 849 814 A1 | 10/2007 |
| EP | 3 282 052 A1 | 2/2018 |

(Continued)

OTHER PUBLICATIONS

European Office Action dated Jul. 28, 2022 in European Patent Application No. 21156902.5, 1 page.

(Continued)

*Primary Examiner* — Eric Hug
*Assistant Examiner* — Matthew M Eslami
(74) *Attorney, Agent, or Firm* — Oblon, McClelland, Maier & Neustadt, L.L.P.

(57) ABSTRACT

The object of the invention is to provide a shoe press belt which has an excellent strength while the variation in strength among its parts being suppressed, and to provide a method for producing such a shoe press belt.

Provided is a shoe press belt for use in a papermaking machine comprising at least one resin layer comprising polyurethane resin, wherein the polyurethane resin comprises as a component a polycarbonate diol comprising one or more unit(s) A expressed by the following formula (1) (wherein $R^1$ is a branched alkylene group having 3 or more and 20 or less of carbon atoms):

$$-R^1-O-\overset{O}{\underset{\|}{C}}-O- \quad (1)$$

16 Claims, 5 Drawing Sheets

(51) Int. Cl.
  *C08G 18/44* (2006.01)
  *C08G 18/48* (2006.01)
  *C08G 64/30* (2006.01)
  *C08K 5/00* (2006.01)
  *C08K 5/053* (2006.01)
  *C08K 5/17* (2006.01)
  *D21F 3/08* (2006.01)

(52) U.S. Cl.
  CPC ....... *C08G 18/4854* (2013.01); *C08G 64/305* (2013.01); *C08K 5/0025* (2013.01); *C08K 5/053* (2013.01); *C08K 5/17* (2013.01); *D21F 3/086* (2013.01)

(56) References Cited

U.S. PATENT DOCUMENTS

| | | | |
|---|---|---|---|
| 2008/0146766 A1 | 6/2008 | Masubuchi et al. | |
| 2014/0352904 A1* | 12/2014 | Singh | C08G 18/7671 525/467 |
| 2016/0130466 A1 | 5/2016 | Jagtap et al. | |
| 2016/0355978 A1* | 12/2016 | Takamori | D21F 3/029 |
| 2018/0094385 A1 | 4/2018 | Hikida | |

FOREIGN PATENT DOCUMENTS

| | | |
|---|---|---|
| JP | 2506713 B2 | 6/1996 |
| JP | 2016-199813 A | 12/2016 |
| WO | WO 2013/013891 A1 | 1/2013 |
| WO | WO 2013/122812 A1 | 8/2013 |
| WO | WO 2014/210103 A1 | 12/2014 |

OTHER PUBLICATIONS

European Third Party Observation issued Jul. 22, 2022, in Application No. EP20210158902, citing documents 15 and 25 through 28 therein, 4 pages.

"Improving the Performance of Polyurethanes: Kuranay Advanced chemicals Showcases at Polyurethanes Technology Conference". Retrieved from the internet: http://kuraray.us.com/2019/09/30/improving-theperformance-of-polymers-kuraray-advanced-chemicalsshowcases-at-polyurethanes-technology-conference/, 2019, 4 pages.

"A Raw Material for Polyurethanes. Offers improved strength and flexibility." Retrieved from the Internet: https://www.kuraray.com/products/diols, Retrieved on Aug. 12, 2022, 5 pages.

Sur, S-H., st at, "Comparison of Properties of Waterbore Polyurethanes Containing Various Polyols", Clean Technol., vol. 24, No. 3, Sep. 2018, pp. 190-197 (with English abstract and unedited computer generated English translation).

"Kuraray's unique Diols and Polyols" last updated in Jun. 2014, Kuraray Co., LTD., 5 pages.

Extended European Search Report dated Aug. 6, 2021 in corresponding European Patent Application No. 21156902.5 citing documents AO-AS therein, 7 pages.

* cited by examiner

SHOE PRESS BELT AND METHOD FOR PRODUCING A SHOE PRESS BELT

CROSS REFERENCE TO RELATED APPLICATIONS

This application is based upon and claims benefit of priority from Japanese Patent Application No. 2020-033891, filed on Feb. 28, 2020, the entire contents of which are incorporated herein by reference.

BACKGROUND

Technical Field

The present invention relates to a shoe press belt and a method for producing a shoe press belt.

Background Art

Papermaking machines for removing moisture from a source material of paper are generally equipped with a wire part, a press part, and a dryer part. These parts are arranged in the order of the wire part, the press part, and the dryer part in a wet paper web transfer direction.

A wet paper web is transferred and moisture thereof is removed while the wet paper web is being successively passed through papermaking devices provided in the wire part, the press part, and the dryer part, and the wet paper web is finally dried in the dryer part. In those parts, the papermaking devices corresponding to a function of dehydrating a wet paper web (wire part), a function of squeezing water (press part), and a function of drying the wet paper web (dryer part) are used.

The press part generally comprises one or more press devices arranged in series in the wet paper web transfer direction. An endless felt is disposed in each press device, or an endless felt formed by connecting an ended felt on a papermaking machine is disposed therein. In addition, each press device has a roll press mechanism made up of a pair of rolls facing each other or a shoe press mechanism in which an endless shoe press belt is interposed between a recessed shoe facing a roll and the roll. The felt, on which the wet paper web is placed, is passed through the roll press mechanism or the shoe press mechanism and pressurized while moving the felt in the wet paper web transfer direction, and thereby moisture of the wet paper web is continuously squeezed from the wet paper web by being absorbed into the felt or by passing moisture through the felt to discharge the moisture to the outside.

In the shoe press belt, a reinforcement material is embedded in resin and the resin constitutes an outer circumferential layer, which is brought into contact with the felt, and an inner circumferential layer, which is in contact with the shoe. In addition, the shoe press belt repeatedly travels between the pressurized roll and the shoe, and therefore the resin of the shoe press belt is required to have an excellent durability.

JP 2016-199813 A proposes a shoe-pressing belt composed of a polyurethane and a reinforcing substrate embedded in the polyurethane such that the polyurethane and the reinforcing substrate are integrated, for the purpose of, in a shoe press belt having a drain, preventing the collapse or impairment of a land or even occurrences of cracks in the land that constitutes the drain, wherein the polyurethane that constitutes at least an outer circumferential surface of the shoe-pressing belt is a thermosetting polyurethane obtained by curing an urethane prepolymer with a curing agent, and wherein the urethane prepolymer comprises a first urethane prepolymer obtained by a reaction of a polyol ingredient containing a given linear aliphatic polycarbonate diol with an aromatic diisocyanate.

SUMMARY

Technical Problem

A shoe press belt provided with a polyurethane layer having linear aliphatic polycarbonate diol as a component of urethane prepolymer is excellent in its strength. On the other hand, the present inventors found that, when linear aliphatic polycarbonate diol was used as a component of an urethane prepolymer, the resulting shoe press belt had variation in strength among the parts of it. The presence of variation in strength among the parts of a shoe press belt may cause a damage or deterioration to the shoe press belt starting from the part with weak strength, which would as a result cause difficulty in improving durability of the shoe press belt.

Accordingly, an object of the present invention is to provide a shoe press belt which has an excellent strength while the variation in strength among its parts being suppressed, and to provide a method for producing such a shoe press belt.

Solution to Problem

The present inventors have made intensive studies in order to achieve the aforementioned object and as a result found that, in a shoe press belt, by combining particular polycarbonate diol, the strength of a polyurethane layer constituting the shoe press belt could be increased while suppressing the variation in strength, and thus accomplished the present invention.

A gist of the present invention is as follows:

[1] A shoe press belt for use in a papermaking machine having at least one resin layer comprising polyurethane resin, wherein
the polyurethane resin comprises as a component a polycarbonate diol comprising one or more unit(s) A expressed by the following formula (1):

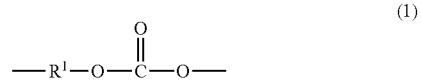

(1)

wherein:
$R^1$ is a branched alkylene group having 3 or more and 20 or less of carbon atoms.

[2] The shoe press belt according to [1], wherein $R^1$ is selected from the group consisting of 3-methylpentylene group, 2,2-dimethylpropylene group, 2-methyloctylene group, 2-butyl-2-ethylpropylene group and 2,2,4-trimethyl-1,6-hexylene group.

[3] the shoe press belt according to [1] or [2], wherein the polycarbonate diol further comprises one or more unit(s) B expressed by the following formula (2):

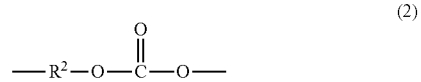

(2)

wherein:

R² is a linear alkylene group having 1 or more and 20 or less of (a) carbon atom(s).

[4] The shoe press belt according to [3], wherein R² is selected from the group consisting of n-butylene group, n-hexylene group, n-nonylene group, n-decylene group, n-undecylene group and n-dodecylene group.

[5] The shoe press belt according to any one of [1] to [4], wherein the polyurethane resin is obtained by reacting an urethane prepolymer having an isocyanate group and comprising as (a) component(s) one or more of the polycarbonate diols with a curing agent having an active hydrogen group.

[6] The shoe press belt according to [5], wherein the urethane prepolymer is obtained by reacting polyisocyanate compound(s) comprising one or more selected from p-phenylene-diisocyanate, 4,4'-methylene bis(phenyl isocyanate), 1,4-bis(isocyanate methyl)cyclohexane, 2,4-tolylene-diisocyanate and 2,6-tolylene-diisocyanate with a polyol compound comprising one or more of the polycarbonate diols.

[7] The shoe press belt according to [6], wherein the polyol compound further comprises polytetramethylene ether glycol and/or polyhexamethylene carbonate diol.

[8] The shoe press belt according to any one of [5] to [7], wherein the curing agent comprises one or more of the polycarbonate diols.

[9] The shoe press belt according to any one of [1] to [4], wherein the polyurethane resin is obtained by reacting an urethane prepolymer having an isocyanate group with a curing agent having an active hydrogen group and comprising one or more of the polycarbonate diols.

[10] The shoe press belt according to [9], wherein the curing agent further comprises an alkylene glycol compound, dimethylthiotoluene diamine and/or diethyltoluene diamine,

[11] The shoe press belt according to [9] or [10], wherein the curing agent comprises 1,4-butanediol, dimethylthiotoluene diamine and/or diethyltoluene diamine.

[12] The shoe press belt according to any one of [9] to [11], wherein the urethane prepolymer is obtained by reacting a polyisocyanate compound with a polyol compound comprising a polyether polyol and/or a linear aliphatic polycarbonate diol.

[13] The shoe press belt according to any one of [1] to [12], having as the resin layer a first layer which constitutes an outer circumferential surface of the shoe press belt, wherein the first layer comprises the polyurethane resin.

[14] The shoe press belt according to any one of [1] to [13], having as the resin layer a second layer which constitutes an inner circumferential surface of the shoe press belt, wherein the second layer comprises the polyurethane resin.

[15] A method for producing a shoe press belt for use in a papermaking machine, the method comprising a step of forming a resin layer comprising a polyurethane resin by curing a polyurethane ingredient, wherein the polyurethane ingredient comprises as a component a polycarbonate diol comprising one or more unit(s) A expressed by the following formula (1):

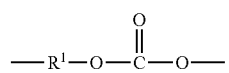

(1)

wherein:

R¹ is a branched alkylene group having 3 or more and 20 or less of carbon atoms.

Advantageous Effects of Invention

The above-mentioned configuration makes it possible to provide a shoe press belt having an excellent strength while suppressing the variation in strength among its parts, and to provide a method for producing such shoe press belt.

DESCRIPTION OF THE EMBODIMENTS

Hereinafter, referring to the appended drawings, preferred embodiments of a shoe press belt and a method for producing a shoe press belt according to the present invention will be described in detail.

<1. Shoe Press Belt>

First, a shoe press belt according to a preferred embodiment of the present invention will be described.

Figure 1:
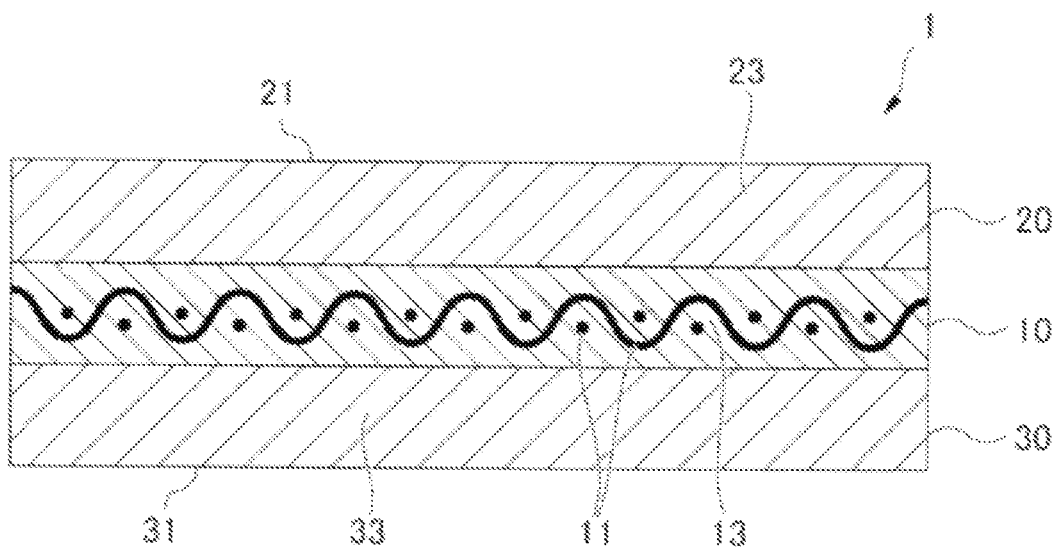
FIG. 1 is a cross-sectional view in a cross machine direction showing a shoe press belt according to an embodiment of the present invention.

FIG. 1 is a cross-sectional view in a cross machine direction showing an example of a shoe press belt according to a preferred embodiment of the present invention. Note that, in the drawing, each member has been emphasized in size as appropriate for ease of illustration and thus does not indicate the actual proportion and size of each member. Herein, the aforementioned cross machine direction may be referred to as "CMD", and the machine direction may be referred to as "MD".

A shoe press belt 1 shown in FIG. 1 is used for transferring a wet paper web in cooperation with a felt in a press part, more specifically in a shoe press mechanism, of a papermaking machine and squeezing moisture from the wet paper web. The shoe press belt 1 forms an endless band-shaped body. That is, the shoe press belt 1 is an annular belt. In addition, a circumferential direction of the shoe press belt 1 is generally disposed along a machine direction (MD) of the papermaking machine.

The shoe press belt 1 shown in FIG. 1 comprises a reinforcing fibrous substrate layer 10, a first resin layer 20 provided on one principal surface on an outer surface side of the reinforcing fibrous substrate layer 10, and a second resin layer 30 provided on the other principal surface on an inner surface side of the reinforcing fibrous substrate layer 10, and the shoe press belt 1 is formed by laminating those layers.

The reinforcing fibrous substrate layer 10 comprises a reinforcing fibrous substrate 11 and resin 13. The resin 13 exists in the reinforcing fibrous substrate layer 10 so as to fill gaps between fibers in the reinforcing fibrous substrate 11. That is, the reinforcing fibrous substrate 11 is impregnated with a part of the resin 13, and the reinforcing fibrous substrate 11 is embedded in the resin 13.

There are no particular limitations with regard to the reinforcing fibrous substrate 11. However, for example, fabrics woven by a weaving machine and the like from warps and weft yarns are commonly used. Moreover, it is also possible to use a grid-like web material of superimposed rows of warps and weft yarns without weaving. Alternatively, two or more of woven fabrics and grid-like web materials, etc. can be used in combination.

There are no particular limitations with regard to the fineness of the fibers constituting the reinforcing fibrous substrate 11. However, for example, the fineness can be set to 300 to 10,000 dtex and can preferably be set to 500 to 6,000 dtex.

Moreover, the fineness of the fibers constituting the reinforcing fibrous substrate 11 may be different depending on a part in which the fibers are used. For example, the fineness of the warps and weft yarns in the reinforcing fibrous substrate 11 may be different.

As a material of the reinforcing fibrous substrate 11, it is possible to use one or a combination of two or more of polyesters (polyethylene terephthalate, polybutylene terephthalate, and the like), aliphatic polyamides (polyamide 6, polyamide 11, polyamide 12, polyamide 612, and the like), aromatic polyamides (aramid), polyvinylidene fluoride, polypropylene, polyether ether ketone, polytetrafluoroethylene, polyethylene, wool, cotton, metals, and the like.

The resin 13 will be described hereinafter.

The first resin layer 20 is a resin layer provided on one principal surface on the outer surface side of the reinforcing fibrous substrate layer 10, and is composed of resin 23. The first resin layer 20 constitutes the outer circumferential surface 21. When the shoe press belt 1 is used, an wet paper web is supported and carried with a felt on the outer circumferential surface 21.

The second resin layer 30 is a resin layer provided on the other principal surface on the inner surface side of the reinforcing fibrous substrate layer 10, and is composed of resin 33. The second resin layer 30 constitutes the inner circumferential surface 31. When the shoe press belt 1 is used, the inner circumferential surface 31 is disposed such that it is in contact with a shoe of the shoe press mechanism (not illustrated).

Next, the resin 13 in the reinforcing fibrous substrate layer 10, the resin 23 of the first resin layer 20, and the resin 33 which constitutes the second resin layer 30 of the shoe press belt 1 are described.

In embodiments of the present invention, at least one resin layer of the reinforcing fibrous substrate layer 10, the first resin layer 20 and the second resin layer 30 of the shoe press belt 1 comprises a polyurethane resin. This polyurethane resin comprises as a component a polycarbonate diol X comprising one or more unit(s) A expressed by the following formula (1):

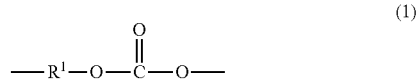

(1)

wherein:
$R^1$ is a branched alkylene group having 3 or more and 20 or less of carbon atoms.

Since the constitution of the resin 13, resin 23 and resin 33 can be considered to be similar, the resin 23 of the first resin layer 20 will be described in detail hereinbelow as a representative. In the description below, a case will be principally described in which the resin 23 comprises a polyurethane resin comprising as a component the polycarbonate diol X described above.

The polyurethane resin which constitutes the resin 23 comprises as a component the above-described polycarbonate diol X. This suppresses the variation in strength in the first resin layer 20 composed of the resin 23 and improves the strength of the first resin layer 20 at the same time, and as a result suppresses the variation in strength among the parts of the shoe press belt 1 and improves the strength of the shoe press belt at the same time.

In detail, a polyurethane layer having a linear aliphatic polycarbonate diol as a component of an urethane prepolymer is excellent in its strength. On the other hand, the present inventors found that, when a linear aliphatic polycarbonate diol was used as a component of an urethane prepolymer, the resulting shoe press belt had variation in strength among the parts of it. The presence of variation in strength among the parts of the shoe press belt may cause a damage or deterioration to the shoe press belt starting from the part with weak strength, which as a result would cause difficulty in improving durability of the shoe press belt.

Accordingly, the present inventors have made intensive studies in order to elucidate the reason therefor and as a result found that, when a linear aliphatic polycarbonate diol is used to prepare an urethane prepolymer, the viscosity of both the urethane prepolymer and of the urethane composition prepared by mixing a curing agent and the urethane prepolymer would be greatly increased, making it difficult to uniformly discharge and apply the urethane composition at the time of producing a shoe press belt. In this case, it is difficult to form an uniform polyurethane layer.

On the other hand, the present inventors found that, when using the polycarbonate diol X comprising the unit A expressed by the formula (1) described above, the increase in viscosity of the resulting urethane composition will be suppressed, making it possible to form an uniform polyurethane resin layer. The present inventors also found that, when a resin layer is formed in such a way using the polycarbonate diol X described above, not only the variation in strength among parts of the shoe press belt would be suppressed, but also the strength of the shoe press belt would be improved as a whole.

In the present specification, unless otherwise stated, "among the parts" refers to the relation between arbitrary parts in surface direction of a resin layer which constitutes a shoe press belt, i.e., a resin layer which is formed by one material. For instance, in the shoe press belt 1 according to the present embodiment, for each of the reinforcing fibrous substrate layer 10, the first resin layer 20 and the second resin layer 30, arbitrary parts in each resin layer in surface direction can be compared. Moreover, the variation in strength among the parts in each resin layer has multiple influences on the shoe press belt, causing the variation in strength among the parts in entire shoe press belt.

It was known that a polyurethane resin prepared with a linear aliphatic polycarbonate diol in general is highly crystalline and better in strength as compared to a case using an aliphatic polycarbonate diol derived from a branched alkylene glycol. However, in the present embodiment, contrary to such general knowledge, it has been found that the shoe press belt 1 obtained using a polycarbonate diol X comprising an unit A expressed by the formula (1) described above has a strength comparable to the case using the linear aliphatic polycarbonate.

In particular, the first resin layer 20 constitutes the outer circumferential surface 21 of the shoe press belt 1. In the shoe press belt 1, the outer circumferential surface 21 is a part which is prone to coming into contact/friction with a felt, etc., associated wearing of the shoe press belt 1, and damages (e.g., cracks) due to bending fatigue of the shoe press belt 1. Accordingly, the durability of the shoe press belt 1 is improved by including a polyurethane resin formed by using the polycarbonate diol X in the first resin layer 20 that constitutes the outer circumferential surface 21 of the shoe press belt 1.

In aforementioned formula (1), $R^1$ is, for each occurrence, same or different branched alkylene group having 3 or more and 20 or less of carbon atoms. $R^1$ may, in specific, be an alkylene group having 3 or more and 20 or less of carbon atoms expressed by the following formula (3):

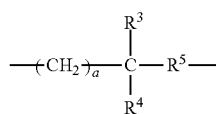  (3)

In the formula (3), $R^3$ is a linear or branched alkyl group,
$R^4$ is H or linear or branched alkyl group,
$R^5$ is linear or branched alkylene group, and
a is an integer equal to 0 or higher.

In $R^3$ and $R^4$, linear alkyl groups include such as a methyl group, ethyl group, n-propyl group, n-butyl group, n-pentyl group, n-hexyl group, n-heptyl group, n-octyl group, n-nonyl group, n-decyl group, n-undecyl group and n-dodecyl group. Moreover, in $R^3$ and $R^4$, branched alkyl groups include such as i-propyl group, t-butyl group and i-butyl group.

$R^3$ is preferably a linear or branched alkyl group having 1 or more and 4 or less of (a) carbon atom(s), more preferably a one selected from the group consisting of a methyl group, ethyl group, n-propyl group, n-butyl group, and i-propyl group, further preferably a methyl group, ethyl group or n-butyl group.

$R^4$ is, preferably H or a linear or branched alkyl group having 1 or more and 4 or less of (a) carbon atom(s), more preferably one selected from the group consisting of H, methyl group, ethyl group, n-propyl group, and i-propyl group, further preferably H, methyl group or ethyl group.

The linear alkylene group for $R^5$ includes, for example, a linear alkylene group having 1 or more and 10 or less of (a) carbon atom(s) such as methylene group, ethylene group, n-propylene group, n-butylene group, n-pentylene group, n-hexylene group, n-heptylene group and n-octylene group. The branched alkylene group for $R^5$ includes, such as, for example, 1-methylpropylene group, 2-methylpropylene group, 1,1-dimethylpropylene group, 1,2-dimethylpropylene group, 1,3-dimethylpropylene group, 2,2-dimethylpropylene group, 1,2,3-trimethylpropylene group, 1,1,2-trimethylpropylene group, 1,2,2-trimethylpropylene group, 1,1,3-trimethylpropylene group, 1-methylbutylene group, 2-methylbutylene group, 1,1-dimethylbutylene group, 1,2-dimethylbutylene group, 1,3-dimethylbutylene group, 1,4-dimethylbutylene group, 2,2-dimethylbutylene group, 2,3-dimethylbutylene group, 1,2,3-trimethylbutylene group, 1,2,4-trimethylbutylene group, 1,1,2-trimethylbutylene group, 1,2,2-trimethylbutylene group, 1,3,3-trimethylbutylene group, 1-methylpentylene group, 2-methylpentylene group, 3-methylpentylene group, 1-methylhexylene group, 2-methylhexylene group and 3-methylhexylene group.

$R^5$ is, preferably a linear alkylene group having 1 or more and 10 or less of (a) carbon atom(s), more preferably a linear alkylene group having 1 or more and 8 or less of (a) carbon atom(s), further preferably one selected from the group consisting of a methylene group, ethylene group and n-hexylene group.

In the above-described formula (3), a is an integer equal to 0 or higher. a is preferably 1 or higher. The upper limit of a is a number such that the carbon number in the formula (3) becomes 20, and is equal to or below 17. a is preferably equal to or below 6, more preferably equal to or below 3.

$R^1$ is, particularly preferably, selected from 3-methylpentylene group, 2,2-dimethylpropylene group, 2-methyloctylene group, 2-butyl-2-ethyl propylene group and 2,2,4-trimethyl-1,6-hexylene group. This allows further suppression of the viscosity of the resulting urethane composition, further suppression of the variation among the parts of the shoe press belt 1, and further improvement in the strength of the shoe press belt 1.

Moreover, the polycarbonate diol X may further comprise one or more unit(s) B expressed by the following formula (2):

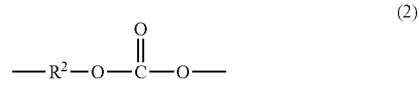  (2)

wherein:
$R^2$ is a linear alkylene group having 1 or more and 20 or less of (a) carbon atom(s). This allows further suppression of the viscosity of the resulting polyurethane composition, further suppression of the variation among the parts of the shoe press belt 1, and further improvement in the strength of the shoe press belt 1.

$R^2$ is, as mentioned above, a linear alkylene group having 1 or more and 20 or less of (a) carbon atom(s). $R^2$ includes, for example, methylene group, ethylene group, n-propylene group, n-butylene group, n-pentylene group, n-hexylene group, n-heptylene group, n-octylene group, n-nonylene group, n-decylene group, n-undecylene group, n-dodecylene group, n-tridecylene group, n-tetradecylene group, n-pentadecylene group, n-hexadecylene group, n-heptadecylene group, n-octadecylene group, n-nonadecylene group and n-icosylene group.

The number of carbon atoms in $R^2$ is, as mentioned above, from 1 to 20, though it is preferably equal to 2 or higher, more preferably equal to 3 or higher. Moreover, the number of carbon atoms in $R^2$ is, preferably equal to or below 15, more preferably equal to or below 12.

Particularly preferably, $R^2$ is selected from the group consisting of n-butylene group, n-hexylene group, n-nonylene group, n-decylene group, n-undecylene group and n-dodecylene group.

Moreover, the proportion of unit B to unit A is, for example, in copolymerizing ratio (unit B/unit A (mol/mol)), from 5% to 95%, preferably from 10% to 90% (inclusive).

A polycarbonate diol X bearing the aforementioned unit A and unit B is expressed, for example, by the following formula (4):

  (4)

In the formula (4), A, for each occurrence independently denotes unit A, B, for each occurrence independently denotes unit B; m and n are each independently an integer from 1 to 40, and $R^6$ is $R^1$ or $R^2$.

Preferably, m and n is each independently an integer from 1 to 34, more preferably an integer from 1 to 29.

Moreover, the proportion between m and n represents the proportion of groups of A and B (proportion in number). m/n is not particularly limited, though, it is, for example, from 0.01 to 30, preferably from 0.02 to 19, more preferably from 0.10 to 10.

Moreover, in the polycarbonate diol X expressed by the formula (4), the sequences of unit A and unit B are not particularly limited. Namely, the polycarbonate diol X expressed by the formula (4) may be a random copolymer, an alternating copolymer or a block copolymer. Furthermore, more than one type of unit A and/or more than one type of unit B may be contained in a polycarbonate diol X expressed by the formula (4).

Besides, apart from unit A and unit B described above, the polycarbonate diol X may comprise other units in which the alkylene group is a cyclic alkylene group. Such cyclic alkylene group may be a group comprising an alicyclic group such as, for example, a cyclopentane ring, cyclohexane ring, cycloheptane ring or cyclooctane ring. In this case, the cyclic alkylene group is bound to the adjacent oxygen group directly on the alicyclic group or via an alkylene group having 1 or more and 3 or less of (a) carbon atom(s) that has been substituted on the alicyclic group. Such cyclic alkylene group includes, for example, 1,4-cyclohexane-diyl bismethylene group.

Besides, the polycarbonate diol X is obtained by reacting a diol corresponding to the alkylene group of $R^1$ or $R^2$, etc. with a carbonate such as diphenylcarbonate, etc. For instance, when $R^1$ is selected from 3-methylpentylene group, 2,2-dimethylpropylene group, 2-methyloctylene group, 2-butyl-2-ethyl propylene group and 1,4-cyclohexane-diyl bismethylene group, a diol selected from 3-methylpentanediol, neopentylglycol, 2-methyloctanediol, 2-butyl-2-ethylpropanediol and 1,4-cyclohexane dimethanol, respectively, is used to synthesize a polycarbonate diol to obtain the polycarbonate diol X.

The number average molecular weight of the above-described polycarbonate diol X is not particularly limited, though it can be, for example, from 250 to 4000 (inclusive), preferably from 500 to 3000 (inclusive). The number average molecular weight of polycarbonate diol can be calculated by, for example, measuring its hydroxyl value.

Specifically, first, the hydroxyl value of the polycarbonate diol X is measured. The hydroxyl value of the polycarbonate diol X can be measured in conformity to JIS K 1557-1:2007. On the other hand, the hydroxyl value of the polycarbonate diol X (mgKOH/g) may also be expressed as the following formula I:

(the hydroxyl value of the polycarbonate diol $X$ (mgKOH/g))=56110/(the number average molecular weight of polycarbonate diol $X$)×(the average number of hydroxyl groups per one molecule of the polycarbonate diol $X$)    (I)

The average number of hydroxyl groups per one molecule of the polycarbonate diol X is assumed to be 2.0. Accordingly, the number average molecular weight of the polycarbonate diol X can be expressed as the following formula (II):

(the number average molecular weight of the polycarbonate diol $X$)=112,220/(the hydroxyl value of the polycarbonate diol $X$ (mgKOH/g))    (II)

In the formula (II) above, the number average molecular weight of the polycarbonate diol X is calculated by substituting the hydroxyl value of the polycarbonate diol X obtained in the measurement of the hydroxyl value. Similar calculation may apply to other polycarbonate diol than the polycarbonate diol X.

The amount of the combined polycarbonate diol X described above is not particularly limited, though it is preferably from 10 mass % to 90 mass % (inclusive), more preferably from 20 mass % to 80 mass % (inclusive) against the total mass of the resin of the part in which the polycarbonate diol X described above is used. This can further improve the strength of the shoe press belt 1 while suppressing the variation in strength among the parts of the shoe press belt 1. Note that the combined amount described above is the percentage against the amount of the resin in the resin 23 excluding inorganic fillers, which will be described later.

At the time of forming the resin 23 of the first resin layer 20, timing of adding the polycarbonate diol X described above is not particularly limited. For instance, the polycarbonate diol X described above may be added at timing from (i) to (iv) below. Hereinbelow, the components of the resin 23 will be described for each case (i)-(iv).

(i) When being Included in Urethane Prepolymer:

For instance, the polycarbonate diol X may be used as a component of an urethane prepolymer. Specifically, the resin 23 may be a polyurethane resin obtained by reacting an urethane prepolymer having an isocyanate group comprising as a component one or more polycarbonate diol X with a curing agent having an active hydrogen group.

That is, in this case, the urethane prepolymer can be obtained by reacting a polyisocyanate compound with a polyol compound comprising one or more polycarbonate diol X. This makes it possible to combine relatively large amount of the polycarbonate diol X, which may further improve the strength of the shoe press belt 1.

In this case, the polyisocyanate compound that constitutes the urethane prepolymer is not particularly limited, and, for example, one or more polyisocyanate compound(s) selected from an aromatic polyisocyanate and an aliphatic polyisocyanate may be used; preferably, a polyisocyanate compound comprising a compound selected from: 2,4-tolylene-diisocyanate (2,4-TDI), 2,6-tolylene-diisocyanate (2,6-TDI), 4,4'-methylene bis(phenyl isocyanate) (MDI), p-phenylene-diisocyanate (PPDI), dimethyl biphenylene diisocyanate (TODD, naphthalene-1,5-diisocyanate (NDI), 4,4-dibenzyldiisocyanate (DBDI), 1,6-hexamethylene diisocyanate (HDI), 1,5-pentamethylene diisocyanate, 1-isocyanate-3-isocyanate methyl-3,5,5-trimethylcyclohexane (IPDI), dicyclohexyl methane 4,4'-diisocyanate (H12MDI), xylylene diisocyanate (XDI), cyclohexane diisocyanate (CHDI), 1,4-bis(isocyanate methyl)cyclohexane (H6XDI) and tetramethylxylylene-diisocyanate (TMXDI), and polymethylene polyphenyl polyisocyanate (Polymeric MDI), and a mixture thereof.

In order to further suppress the variation among the parts of the resulting resin 23, polyisocyanate compound particularly preferably comprises one or more selected from p-phenylene-diisocyanate, 4,4'-methylene bis(phenyl isocyanate), 1,4-bis(isocyanate methyl)cyclohexane and 2,4-tolylene-diisocyanate and 2,6-tolylene-diisocyanate.

Moreover, the polyol compound comprises not only the polycarbonate diol X described above, but it may also comprise other polyol compounds. Such polyol compounds are not particularly limited and include, for example, polyester polyols such as polycaprolactone polyol, polyethylene adipate; polyether polyols such as polyethylene glycol, polyoxypropylene glycol, polyhexamethylene ether glycol, polytetramethylene ether glycol (PTMG); and linear aliphatic polycarbonate diol, polyether carbonate diol, trimethylolpropane, polybutadiene polyol, perfluoropolyether polyol, long-chain polyol compounds such as silicon polyols such as silicon diol, any one of which may be used alone, or more than one may be used in combination.

Linear aliphatic polycarbonate diols include such as, for example, polymethylene carbonate diol, polyethylene carbonate diol, polypropylene carbonate diol, polybutylene carbonate diol, polypentamethylene carbonate diol, polyhexamethylene carbonate diol, polyheptamethylene carbonate diol, and polyoctamethylene carbonate diol.

In order to increase hydrolysis resistance of the resin 23 and to further improve the durability of the shoe press belt 1, the polyol compound preferably comprises, in addition to the polycarbonate diol X expressed by the above-described formula (1), a polyether polyol and/or a linear aliphatic polycarbonate diol, more preferably polytetramethylene ether glycol and/or polyhexamethylene carbonate diol.

Moreover, when the urethane prepolymer comprises other polyol compounds than the polycarbonate diol X described above, the proportion of the polycarbonate diol X to all polyol compounds in the urethane prepolymer is, for example, equal to or more than 10 mass % and below 90 mass %, preferably equal to or more than 25 mass % and equal to or less than 80 mass %.

The curing agent having an active hydrogen group is not particularly limited, and a curing agent which comprises one or more selected from the group consisting of polyol compounds and polyamines may be used.

As a polyol compound which can be contained in the curing agent, in addition to the long-chain polyol compounds mentioned above, various aliphatic polyol compounds and various alicyclic or aromatic polyol compounds may be used.

Aliphatic polyol compounds are not particularly limited and include, for example, alkylene glycol compounds such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,20-icosanediol, 2-methyl-1,3-propanediol, neopentylglycol, 2-butyl-2-ethyl-1,3-propanediol, 3-methyl-1,5-pentanediol, 2-ethyl-1,3-hexanediol and 2-methyl-1,8-octanediol, and glycerin, ditrimethylol propane, trimethylol propane (TMP), pentaerythritol and dihydroxymethyl propionic acid (DHPA), and the like.

Alicyclic polyol compounds are not particularly limited and include, for example, 1,4-cyclohexane dimethanol, hydrogenated bisphenol A, and the like.

Aromatic polyol compounds are not particularly limited and include, for example, hydroquinone bis-β-hydroxyethyl ether (HQEE), hydroxyphenyl ether resorcinol (HER), 1,3-bis(2-hydroxyethoxybenzene), 1,4-bis(2-hydroxyethoxybenzene), bisphenol A, an alkylene oxide adduct of bisphenol A, bisphenol S, an alkylene oxide adduct of bisphenol S, and the like.

Polyamines are not particularly limited and include hydrazine, ethylene diamine, 4,4'-methylene-bis-(2-chloroaniline) (MOCA), dimethylthiotoluene diamine (DMTDA), diethylthiotoluene diamine, diethyltoluene diamine (DETDA), trimethylene glycol di(p-aminobenzoate) (TMAB), 4,4'-methylene-bis-(3-chloro-2,6-diethylaniline) (MCDEA), 4,4'-methylene-bis-(2,6-diethylaniline) (MDEA), triisopropanolamine (TIPA), p-bis(aminocyclohexyl)methane (PACM), naphthalene-1,5-diamine, xylylene diamine, phenylene diamine, toluene-2,4-diamine, t-butyltoluene diamine, 1,2-bis(2-aminophenylthioethane), and the like.

Among those mentioned above, the curing agent preferably comprises aliphatic polyol compound and/or polyamine, more preferably alkylene glycol compound, dimethylthiotoluene diamine and/or diethyltoluene diamine, further preferably 1,4-butanediol, dimethylthiotoluene diamine and/or diethyltoluene diamine, in order to further improve the strength of the resulting resin 23 while further suppressing the variation in strength among the parts of the shoe press belt 1.

Moreover, the resin 23 may comprise inorganic fillers such as titanium oxide, kaolin, clay, talc, diatomaceous earth, calcium carbonate, calcium silicate, magnesium silicate, silica and mica, which can be alone or in combination of two or more.

(ii) When being Included in Curing Agent:

The polycarbonate diol X may also be used as, for example, a component of a curing agent. Specifically, the resin 23 can be a polyurethane resin obtained by reacting an urethane prepolymer that has an isocyanate group with a curing agent that has an active hydrogen group and comprises one or more polycarbonate diol X. As a consequence of including one or more polycarbonate diol X in the curing agent in such a way, the combined viscosity of the urethane composition comprising the urethane prepolymer and the curing agent can also be decreased. This may improve the strength of the shoe press belt 1 and at the same time further suppressing the variation in strength among its parts.

In this case, as the polyisocyanate compound of the urethane prepolymer, for example, various polyisocyanate compound in the aforementioned (i) may be used. Preferably, the polyisocyanate compound includes one or more selected from p-phenylene-diisocyanate, 4,4'-methylene bis(phenyl isocyanate), 1,4-bis(isocyanatemethyl)cyclohexane, and 2,4-tolylene-diisocyanate and 2,6-tolylene-diisocyanate.

In order to increase hydrolysis resistance of the resin 23 and to further improve the durability of the shoe press belt 1, the polyol compound preferably comprises a polyether polyol and/or linear aliphatic polycarbonate diol, more preferably polytetramethylene ether glycol and/or polyhexamethylene carbonate diol.

As mentioned above, in the case of (ii), the curing agent comprises one or more polycarbonate diol X. The curing agent may also comprise other curing agent(s) in addition to the one or more polycarbonate diol X. As such curing agent, a curing agent which can be used in the case of the aforementioned (i) may be used.

In this case, the curing agent preferably comprises, in addition to the one or more polycarbonate diol X, an aliphatic polyol compound and/or polyamine, more preferably an alkylene glycol compound, dimethylthiotoluene diamine and/or diethyltoluene diamine, further preferably 1,4-butanediol, dimethylthiotoluene diamine and/or diethyltoluene diamine.

Moreover, when the curing agent comprises other curing agent(s) than the one or more polycarbonate diol X, the proportion of the one or more polycarbonate diol X in the curing agent is, for example, equal to or more than 10 mass % and below 100 mass %, preferably equal to or more than 50 mass % and equal to or below 95%.

Moreover, the resin 23 may comprise inorganic fillers such as titanium oxide, kaolin, clay, talc, diatomaceous earth, calcium carbonate, calcium silicate, magnesium silicate, silica and mica, which can be alone or in combination of two or more.

(iii) When being Included in Urethane Prepolymer and Curing Agent:

Moreover, one or more polycarbonate diol X may be included as components of both the urethane prepolymer and curing agent. Specifically, the resin 23 may be a polyurethane resin obtained by reacting an urethane prepolymer that has an isocyanate group and comprises as a component one or more polycarbonate diol X with a curing agent that has an active hydrogen group and comprise one or more polycarbonate diol X.

In this case, as the polyisocyanate compound of the urethane prepolymer, for example, various polyisocyanate compound in the aforementioned (i) may be used. Preferably, the polyisocyanate compound comprises one or more selected from p-phenylene-diisocyanate, 4,4'-methylene bis (phenyl isocyanate), 1,4-bis(isocyanate methyl)cyclohexane and 2,4-tolylene-diisocyanate and 2,6-tolylene-diisocyanate.

Moreover, in the case of (iii), the urethane prepolymer not only comprises the polycarbonate diol X, but it may also comprise other polyol compounds. In order to further suppress the variation in strength among the shoe press belt 1 while further improving the strength of it, the polyol compound preferably comprises a polyether polyol and/or a linear aliphatic polycarbonate diol, more preferably polytetramethylene ether glycol and/or polyhexamethylene carbonate diol.

Moreover, when the urethane prepolymer comprises other polyol compounds than the polycarbonate diol X, the proportion of the polycarbonate diol X to all polyol compounds in the urethane prepolymer is, for example, equal to or more than 10 mass % and below 90 mass %, preferably equal to or more than 25% by and equal to or below 80 mass %.

As mentioned above, in the case of (iii), the curing agent comprises one or more polycarbonate diol X. Moreover, the curing agent may also comprise other curing agent(s) in addition to the one or more polycarbonate diol X. As such curing agent, a curing agent(s) which can be used in the case of the aforementioned (i) may be used.

In this case, the curing agent preferably comprises, in addition to the one or more polycarbonate diol X, an aliphatic polyol compound and/or a polyamine, more preferably an alkylene glycol compound, dimethylthiotoluene diamine and/or diethyltoluene diamine, further preferably 1,4-butanediol, dimethylthiotoluene diamine and/or diethyltoluene diamine.

Moreover, when the curing agent comprises other curing agent(s) than the one or more polycarbonate diol X, the proportion of the one or more polycarbonate diol X in the curing agent is, for example, equal to or more than 10 mass % and below 100 mass %, preferably equal to or more than 50 mass % and equal to or below 95 mass %.

Moreover, the resin 23 may comprise inorganic fillers such as titanium oxide, kaolin, clay, talc, diatomaceous earth, calcium carbonate, calcium silicate, magnesium silicate, silica and mica, which can be alone or in combination of two or more.

(iv) Case of Forming Polyurethane Resin by One-Shot Method:

In the aforementioned (i) to (iii), the polyurethane resin was formed by curing the urethane prepolymer with the curing agent. However, the polyurethane resin may also be formed by one-shot method.

In this case, one or more polycarbonate diol X and a polyisocyanate compound described in detail in the aforementioned (i), and, if necessary, a polyol compound, curing agent and/or inorganic filler described in detail in the description of the urethane prepolymer is mixed, and the resulting urethane composition is cured to form a polyurethane resin as the resin 23 of the first resin layer 20.

Note that, for each of (i) to (iv), when the polyurethane resin formed by using the polycarbonate diol X is contained either in the resin 33 of the second resin layer 30 or in the resin 13 of the reinforcing fibrous substrate layer 10, the first resin layer 20 do not have to comprise the aforementioned polyurethane resin. In this case, as ingredients of the resin 23 of the first resin layer 20, a thermosetting resin such as a polyurethane resin (note that it does not comprise polycarbonate diol X as its component), an epoxy resin and acryl resin, or a thermoplastic resin such as polyamide, polyarylate and polyester, may be used alone or in combination of two or more.

As the resin 33 which constitutes the second resin layer 30, resin materials which can be used in the first resin layer 20 as mentioned above may be used alone or in combination of two or more. The resin 33 which constitutes the second resin layer 30 may be the same as or different from the resin 23 which constitutes the first resin layer 20 in the type and composition. In particular, from the perspective of improving the durability of the second resin layer 30 and of improving efficiency in resin production, it is preferred that the resin 33 is the same as the resin 23 of the first resin layer 20.

Moreover, the second resin layer 30 preferably comprises a polyurethane resin formed by using the polycarbonate diol X. The second resin layer 30 constitutes the inner circumferential surface 31 of the shoe press belt 1. In the shoe press belt 1, inner circumferential surface 31 is a part which is prone to being damaged (e.g., cracks) due to friction with the shoe upon using the shoe press belt 1 and bending fatigue of the shoe press belt 1. Accordingly, the durability of the shoe press belt 1 is improved by including a polyurethane resin formed by using the polycarbonate diol X in the second resin layer 30 which constitute the inner circumferential surface 21 of the shoe press belt 1.

As the resin 13 which constitutes the reinforcing fibrous substrate layer 10, resin materials which can be used in the first resin layer 20 as mentioned above may be used alone or in combination of two or more. The resin 13 which constitutes the reinforcing fibrous substrate layer 10 may be the same as or different from the resin 23 which constitutes the first resin layer 20 in the type and composition. In particular, from the perspective of improving efficiency in resin production, the resin 13 which constitutes the reinforcing fibrous substrate layer 10 could be the same as the resin 23 of the first resin layer 20.

Moreover, the reinforcing fibrous substrate layer 10 preferably comprises a polyurethane resin formed by using the polycarbonate diol X. This improves the durability of the shoe press belt 1.

The dimensions of the shoe press belt 1 as mentioned above are not particularly limited, and set as appropriate for its intended use.

For instance, the width of the shoe press belt 1 is not particularly limited, though it may be set to between 700 mm and 13500 mm, preferably between 2500 mm and 12500 mm.

Moreover, for example, the length (circumference) of the shoe press belt 1 is not particularly limited, though it may be set to between 150 cm and 1500 cm, preferably between 200 cm and 1100 cm.

Moreover, the thickness of the shoe press belt 1 is not particularly limited, though it may be set to be, for example, between 1.5 mm and 7.0 mm, preferably between 2.0 mm and 6.0 mm.

Moreover, the thickness of the shoe press belt 1 may be different for each part, or it may be the same.

As above, in the shoe press belt 1 according to the present embodiments, at least any one of the resin 13 of the reinforcing fibrous substrate layer 10, the resin 23 of the first resin layer 20, and the resin 33 of the second resin layer 30 comprises a polyurethane resin which comprises as a component the polycarbonate diol X described above. Accordingly, the shoe press belt 1 has suppressed variation in strength among the parts and is excellent in strength.

Figure 2:
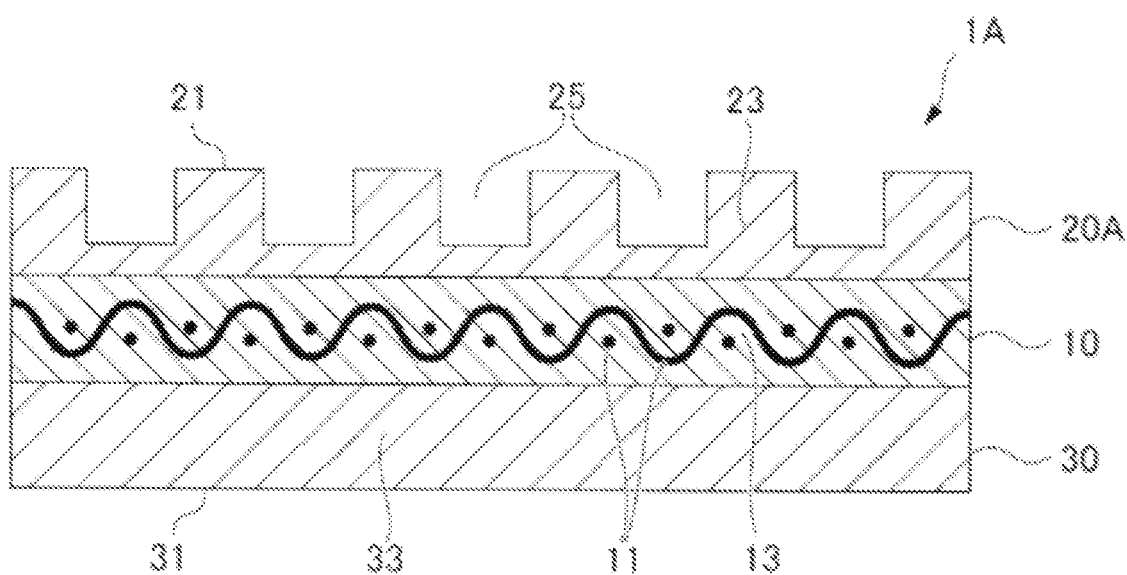
FIG. 2 is a cross-sectional view in a cross machine direction showing a shoe press belt according to another embodiment of the present invention.

Next, shoe press belts according to other embodiments of the present embodiments will be described. FIG. 2 is a cross-sectional view in a cross machine direction showing a shoe press belt according to another embodiment of the present invention. Hereinbelow, the differences from the aforementioned embodiments will be principally described, while cutting description about similar matters.

As shown in FIG. 2, the shoe press belt 1A has multiple drains 25 formed on the outer circumferential surface 21 of the first resin layer 20A. Because the shoe press belt 1A has the drains 25, more moisture can be dehydrated from the supported wet paper web upon using the shoe press belt 1A.

The configuration of the drain 25 is not particularly limited, though, in general, multiple continuous drains are formed in parallel in the machine direction of the shoe press belt 1A. For instance, the groove width may be set to between 0.5 mm and 2.0 mm, the groove depth between 0.4 mm and 2.0 mm, and the number of drains between 5 and 20 drains/inch. Moreover, the cross-sectional shape of the drain 25 may be set as appropriate, such as a rectangle, trapezoidal, U-shaped, or it may be set such that the parts where the land and groove bottom are met with the groove wall are rounded.

Moreover, the configurations of these drains 25 may be the same for the groove width and depth, the number of drains and the cross-sectional shape, or the drains of different configurations may be combined. Furthermore, these drains 25 may be formed as discontinous bodies, or may be formed as multiple drains which are arranged in parallel to the cross machine direction.

As above, in the shoe press belt 1A according to the present embodiment, too, at least any one of the resin 13 of the reinforcing fibrous substrate layer 10, the resin 23 of the first resin layer 20A, the resin 33 of the second resin layer 30 comprises a polyurethane resin which comprises as a component the polycarbonate diol X described above. Accordingly, the shoe press belt 1A has suppressed variation in strength among the parts, and is excellent in strength.

<2. Method for Producing a Shoe Press Belt>

Figure 3:
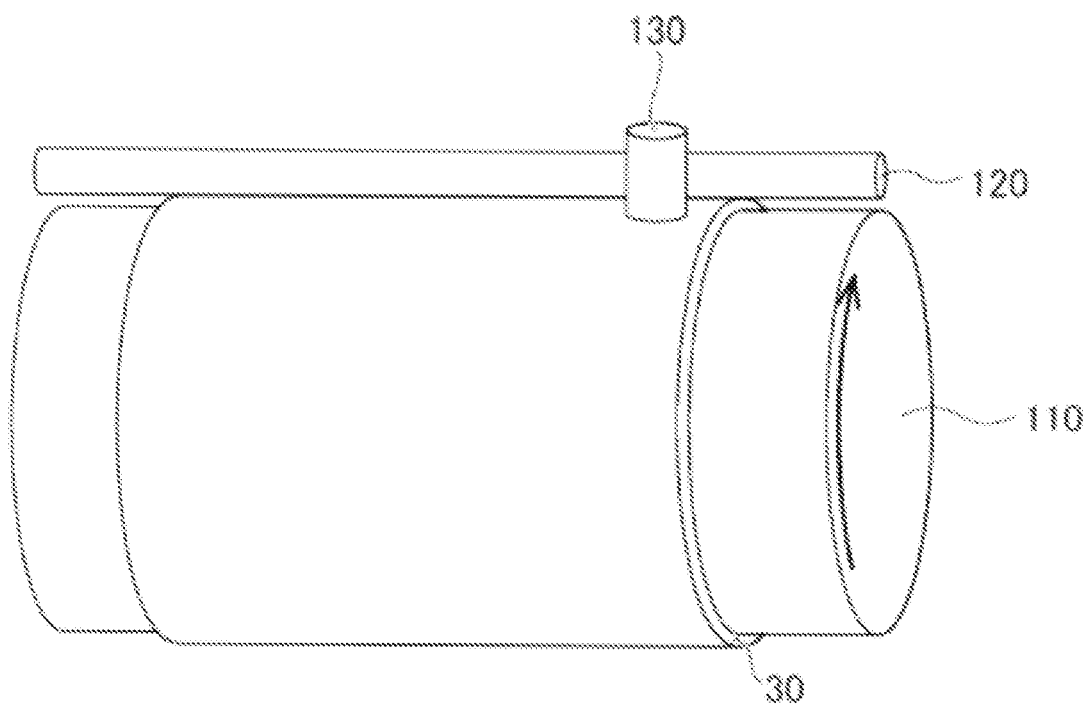
FIG. 3 is a schematic diagram for illustrating a preferred embodiment of a method of producing a shoe press belt according to the present invention.
Figure 4:
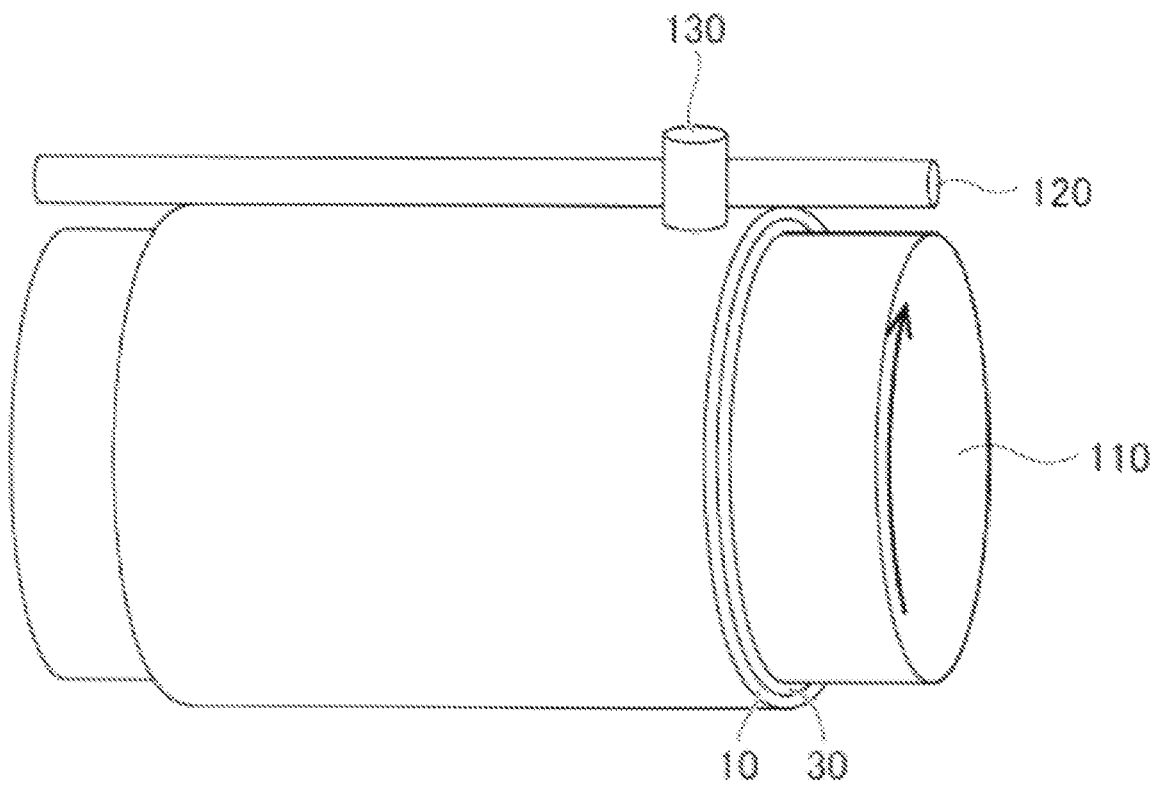
FIG. 4 is a schematic diagram for illustrating a preferred embodiment of a method of producing a shoe press belt according to the present invention.
Figure 5:
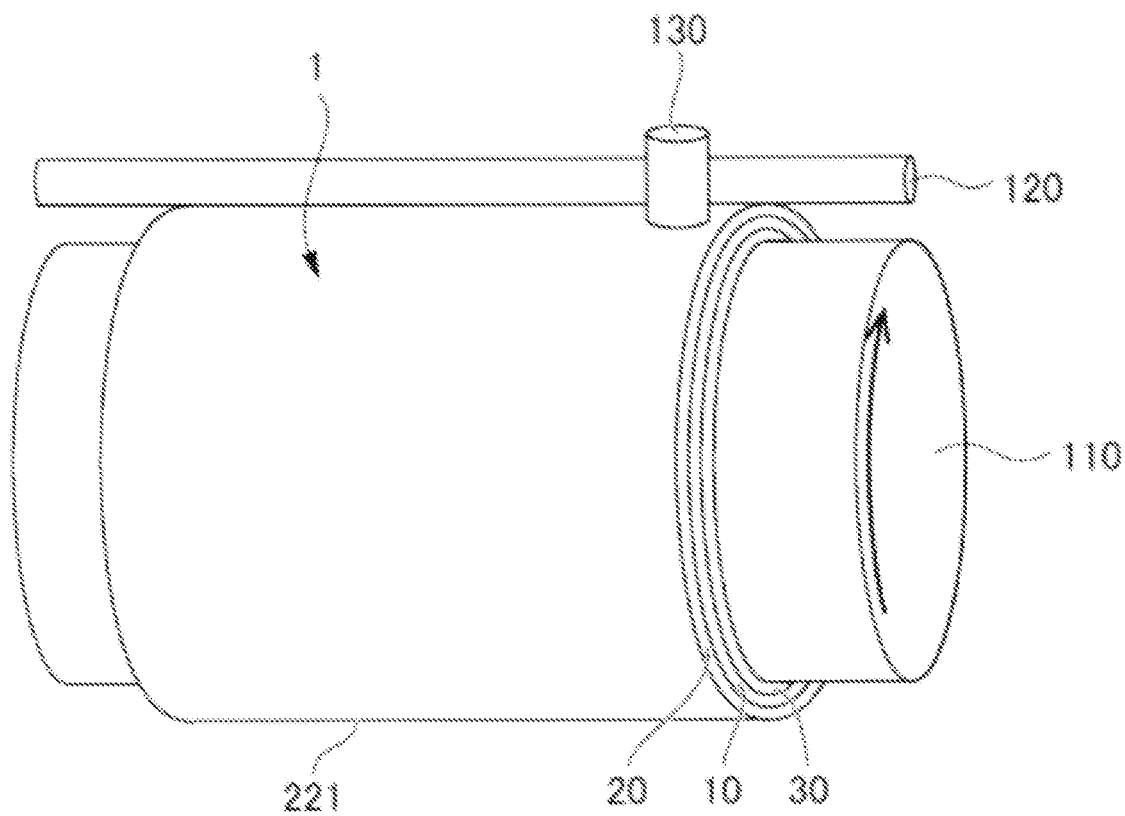
FIG. 5 is a schematic diagram for illustrating a preferred embodiment of a method of producing a shoe press belt according to the present invention.

Next, preferred embodiments of a method for producing a shoe press belt of the present invention will be described. FIGS. 3 to 5 are schematic drawings illustrating the preferred embodiments of the method for producing the shoe press belt.

The method for producing the shoe press belt according to the present invention is a method for producing a shoe press belt for use in a papermaking machine, comprising a step of forming a resin layer comprising a polyurethane resin by curing a polyurethane ingredient, wherein:

the polyurethane ingredient comprises as a constituent unit polycarbonate diol comprising one or more unit(s) A expressed by the following formula (1):

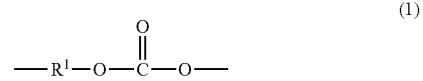

wherein:

$R^1$ is a branched alkylene group having 3 or more and 20 or less of carbon atom(s).

Further, a method for producing a shoe press belt according to one embodiment of the present invention comprises a step of forming a resin layer which forms a first resin layer 20, a reinforcing fibrous substrate layer 10, and a second resin layer 30.

In the step of forming a resin layer, a resin layer is formed. In this step, specifically, a laminated body is formed, which has the reinforcing fibrous substrate layer 10, in which annular and band-shaped reinforcing fibrous substrate 11 is embedded in the resin 13, and the first resin layer 20 and the second resin layer 30 laminated on both sides of the reinforcing fibrous substrate layer 10 as resin layers.

The formation of such laminated body can be made by any method, though, in the present embodiment, the second resin layer 30 is formed. Next, the reinforcing fibrous substrate 11 is disposed on one surface of the second resin layer 30, and a resin material is applied onto the reinforcing fibrous substrate 11 and allowed to be impregnated and penetrated in it to form a laminated body in which the reinforcing fibrous substrate layer 10 and the second resin layer 30 are integrated. Then, the first resin layer 20 is formed on the surface of the reinforcing fibrous substrate layer 10 which is orientated opposite to the bonding plane of the reinforcing fibrous substrate layer 10 and the second resin layer 30.

Specifically, for example, first, as shown in FIG. 3, a resin material is applied to the surface of the mandrel 110 on which a release agent has been applied, while rotating the mandrel 110, such that the thickness of the resin will be from 0.8 to 3.5 mm. This forms a resin precursor layer that is to be the second resin layer 30. Then, the temperature of the resin precursor layer is risen to between 40 and 140° C., pre-cured it for 0.5 to 1 hour to form the second resin layer 30.

Then, the reinforcing fibrous substrate 11 is disposed onto the pre-cured second resin layer 30 (not illustrated), and, as shown in FIG. 4, while rotating the mandrel 110, a resin material which will form the reinforcing fibrous substrate layer 10 is applied in 0.5 to 2.0 mm, allowed to be impregnated and penetrated in the reinforcing fibrous substrate, and at the same time bonded to the second resin layer 30 to form a laminated body in which the reinforcing fibrous substrate layer 10 and the second resin layer 30 are integrated.

Thereafter, as shown in FIG. 5, while rotating the mandrel 110, a resin material which will form the first resin layer 20 is applied onto the surface of the reinforcing fibrous substrate layer 10 described above and allowed to be impregnated in it to form a resin precursor layer of thickness of 1.5 to 4 mm, which is to be the first resin layer 20. Then, the resin precursor layer is heated and cured at 70 to 140° C. for 2 to 20 hours to form a laminated body in which the first resin layer 20, the reinforcing fibrous substrate layer 10, and the second resin layer 30 are laminated.

Besides, the application of the resin material may be done by any method, though, in the present embodiment, this is done by discharging the resin material from the injection molding nozzle 130, while rotating the mandrel 110, and at the same time uniformly applying the provided resin material using a coater bar 120.

Here, at least any one of the resin 13 of the reinforcing fibrous substrate layer 10, the resin 23 of the first resin layer 20, and the resin 33 of the second resin layer 30 comprises a polyurethane resin which comprises as a component the polycarbonate diol X described above. As mentioned above, when the urethane composition (resin material) comprises the polycarbonate diol X described above as a component, the increase in its viscosity can be suppressed. Accordingly, it is possible to form a uniform polyurethane resin layer.

Moreover, heating method is not particularly limited, though, for example, methods using far-infrared heater, etc. may be used.

The obtained laminated body goes through polishing or buff processing or as appropriate for the outer circumferential surface 21 and the inner circumferential surface 31, the ends of width direction are cut as appropriate and cleaned up, to provide the shoe press belt 1. The shoe press belt 1 is produced as above.

Moreover, when the shoe press belt 1A is to be produced, for a laminated body formed in the aforementioned resin layer-forming step, the drains 25 may be formed on the outer circumferential surface 21 as follows.

The formation of such drains 25 can be done by any method, though, for example, the drains 25 may be formed by: polishing/buff-processing the outer surface of the laminated body obtained as above to achieve the desired thickness of the shoe press belt 1 (not illustrated), then, while rotating the mandrel 110, bringing a grooving device to which multiple disk-like rotary blades into contact with the outer circumferential surface 21.

The method for producing the shoe press belt in the above-described embodiment has been described as mandrel (one-roll) production method. However, as another embodiment, a two-roll production method as described below can also be employed. First, an annular reinforcing fibrous substrate 11 is hung over two rolls placed in parallel, and a resin is applied onto this reinforcing fibrous substrate 11, impregnated and laminated to form the second resin layer 30 with the reinforcing fibrous substrate layer 10. Then, this is turned over, and the first resin layer 20 is formed on the surface of the inverted reinforcing fibrous substrate layer 10. This provides the shoe press belt 1. Besides, the order of formation of each resin layer may be optional.

Hereinabove, the present invention has been described on the basis of the preferred embodiment in detail. However, the present invention is not limited thereto, and it is possible to replace each configuration with an arbitrary configuration that can exert a similar function or add an arbitrary configuration.

EXAMPLE

Hereinafter, the present invention will be described more specifically on the basis of examples. However, the present invention is not limited to those examples.

1. Production of Shoe Press Belt and Polyurethane Sheet Test Piece

Prior to producing shoe press belts, first, we prepared polycarbonate diols indicated in Table 1, polytetramethylene ether glycols indicated in Table 2, and resin materials (urethane compositions) of the compositions of Examples 1-6 and Comparative Examples 1-4 indicated in Table 3 obtained using these polycarbonate diols and the polytetramethylene ether glycols. Note that, for all resin materials, the urethane prepolymer and the curing agent were combined such that the combination ratio would be [H]/[NCO] ratio=0.95.

Next, shoe press belts were prepared according to the following method using the resin materials of Examples 1-6 and Comparative Examples 1-4.

To a surface of a mandrel having a diameter of 1500 mm and rotatable by any appropriate driving means, a resin material of either of Examples 1-6 and Comparative Examples 1-4 was applied to 1.4 mm thick while rotating the mandrel, using an injection molding nozzle that is capable of running parallel to the rotary shaft of the mandrel. This formed an uncured shoe-side resin layer (second resin layer). Then, the mandrel was left being rotated at a room temperature for 10 minutes, heated to 140° C. by a heating device attached to the mandrel, and pre-cured at 140° C. for 1 hour.

Next, a grid-like web material that consists of warps interposed between weft yarns where the intersection of a weft yarn and a warp was joined with urethane-type resin adhesive was placed in one layer on the outer circumferential surface of the shoe-side resin layer such that weft yarns are arranged along the shaft of the mandrel leaving no space. Here, the weft yarn of the grid-like web material is multifilament twist yarn of polyethylene terephthalate fiber of 5000 dtex, whereas the warp is multifilament yarn of polyethylene terephthalate fiber of 550 dtex. The warp density was set to 1 yarn/cm, whereas weft yarn density was set to 4 yarns/cm.

Next, a yarn wound layer was formed by helicoidally winding multifilament yarns of polyethylene terephthalate fiber of 6700 dtex around on the circumference of this grid-like web material with a pitch of 30 yarns/5 cm, and the grid-like web material and yarn wound layer together formed a reinforcing fibrous substrate. Then, the resin material same as that of the shoe-side resin layer (resin materials of Examples 1-6 and Comparative Examples 1-4) was applied so as to close gaps in the reinforcing fibrous substrate, forming a laminated body in which the reinforcing fibrous substrate layer and the shoe-side resin layer are integrated.

Next, over the reinforcing fibrous substrate layer, while rotating the mandrel, the resin material same as those of the reinforcing fibrous substrate layer and shoe-side resin layer (resin materials of Examples 1-6 and Comparative Examples 1-4) was applied to about 2.5 mm thick using an injection molding nozzle that is capable of running parallel to the rotating shaft of the mandrel to form an uncured felt-side resin layer (first resin layer).

Then, this was left at room temperature for 40 minutes while keeping the mandrel being rotated, further heated to 140° C. with heating equipment attached to the mandrel, and each resin layer was thermally cured at 140° C. for 4 hours. This formed a laminated body in which the felt-side resin layer, the reinforcing fibrous substrate layer, and the shoe-side resin layer are integrated.

Subsequently, the felt-contact surface of the felt-side resin layer was polished such that the total thickness would be 5.2 mm to give a laminated body.

After the steps above, shoe press belts according to Examples 1-6 and Comparative Examples 1-4 were obtained. An evaluation of hardness was performed for the obtained shoe press belts. Moreover, in order to evaluate the breaking strength and variation in tensile testing, test pieces of 1.0 mm thick polyurethane sheet were cut out from arbitrary 20 positions of the felt-side resin layer.

2. Evaluation 2.1 Prepolymer Viscosity

For prepolymers used for resin materials of Examples 1-6 and Comparative Examples 1-4, viscosity was measured. The viscosity of prepolymers at temperatures 50 and 80° C. were measured using a B-type viscometer (TOKI SANGYO Co., Ltd., Product name: TVB-10H). The rotor used was H3 rotor, and the measurement was performed at revolution speed of 50 rpm for the cases of 200 to 2,000 mPa·s, 5 rpm for the cases of 2,000 to 20,000 mPa·s.

2.2 Evaluation of Hardness

Hardness was measured for the outer circumferential surfaces of the shoe press belts according to Examples 1-6 and Comparative Examples 1-4. Specifically, the surface hardness of the felt-side resin layers was measured in conformity to JIS K 6301:1995 and using an A-type, spring-type hardness tester.

2.3 Evaluation of Breaking Strength in Tensile Testing

The breaking strength was measured using a universal tensile testing machine as the testing machine and a test piece of dumbbell-No. 3-shape defined in JIS K 6251 for the sample shape, at tension rate of 500 mm/min, and evaluated as stress (MPa) at the time of breaking of the test piece. Twenty measurements were made for each Example/Comparative Example, and the average value was presented.

2.4 Evaluation of Variation in Breaking Strength

The variation in the breaking strength was evaluated by calculated standard deviations (SDs) for 20 measurements of the breaking strength in the tensile testing.

Table 3 shows the results of the above evaluations along with the compositions of the resin materials of Examples 1-6 and Comparative Examples 1-4, etc.

In Table 3, "MDI" indicates 4,4'-methylene bis(phenyl isocyanate), "H6XDI" indicates 1,4-bis(isocyanate methyl) cyclohexane, "PPDI" indicates p-phenylene-diisocyanate, "TDI" indicates the mixture of 2,4-tolylene-diisocyanate and 2,6-tolylene-diisocyanate, "BD" indicates 1,4-butanediol, and "DMTDA" indicates dimethylthiotoluene diamine, respectively.

Moreover, the number average molecular weight of the polycarbonate diol in Table 1 was calculated by measuring the hydroxyl value for each polycarbonate diol and calculating the number average molecular weight by the formula (II) described above based on the obtained hydroxyl value. The same applies to polytetramethylene ether glycols in Table 2.

TABLE 1

| Polycarbonate Diol | Diol Constituents | | Diol 1/ Diol 2 (mol/mol) | Number Average Molecular Weight | Hydroxyl Value (mg KOH/g) |
| --- | --- | --- | --- | --- | --- |
| | Diol 1 | Diol 2 | | | |
| PCD1 | 3-methyl-1,5-peranediol | 1,6-hexanediol | 90/0 | 1,979 | 56.7 |
| PCD2 | 3-methyl-1,5-pentanediol | 1,6-hexanediol | 90/10 | 988 | 113.6 |
| PCD3 | 2,2-dimethyl-1,3-propanediol | 1,4-butanediol | 50/50 | 960 | 116.9 |
| PCD4 | 2-methyl-1,8-octanediol | 1,9-nonanediol | 36/65 | 2,015 | 55.7 |
| PCD5 | 1,6-hexanediol | — | 100/0 | 1,002 | 112.0 |
| PCD6 | 1,6-hexanediol | — | 100/0 | 2,074 | 54.1 |
| PCD7 | 1,6-hexanediol | 1,5-pentanediol | 50/50 | 1,983 | 56.6 |
| PCD8 | 1,6-hexanediol | 1,5-pentanediol | 50/50 | 1,009 | 111.2 |

TABLE 2

| Polytetramethylene Ether Glycol | Number Average Molecular Weight | Hydroxyl Value (mg KOH/g) |
| --- | --- | --- |
| PTMG1 | 648 | 173.1 |
| PTMG2 | 1,039 | 108.0 |
| PTMG3 | 1,990 | 56.4 |

TABLE 3

| | | | Example 1 | Example 2 | Example 3 | Example 4 | Example 5 | Example 6 | Comparative Example 1 | Comparative Example 2 | Comparative Example 3 | Comparative Example 4 |
| --- | --- | --- | --- | --- | --- | --- | --- | --- | --- | --- | --- | --- |
| Resin material | Prepolymer | Test of isocyanete compound | MDI | H0XDI | MDI | PPDI | MDI | MDI | MDI | PPDI | TDI | MDI |
| | | Type of polyol compound | PCD1 | PCD2 | PCD1 | PTMG1 44.7% PTMG2 55.3% | PTMG3 50% PCD1 50% | PTMG3 50% PCD1 50% | PCD5 | PCD6 | PTMG2 | PCD7 45.6% PCD8 54.4% |
| | | Proportion of PCD in polyol compound (mass %) | 100 | 100 | 100 | 0 | 50 | 50 | 100 | 100 | 0 | 100 |
| | | NCO % | 9.66 | 6.56 | 14.68 | 7.38 | 9.59 | 14.71 | 9.06 | 3.51 | 6.06 | 8.83 |

TABLE 3-continued

|  |  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|---|
|  | Curing agent | Type | BD | BD | BD PCD1 | BD PCD3 | BD | BD PCD4 | BD | BD | DMTDA | BD |
|  |  | Proportion of PCD in curing agent (mass %) | 0 | 0 | 72 | 86 | 0 | 74 | 0 | 0 | 0 | 0 |
|  |  | PCD content in polyurethene (mass %) | 57 | 62 | 57 | 23 | 29 | 41 | 53 | 84 | 0 | 56 |
| Evaluation | Prepolymer viscosity (mPa · s) | @ 50° C. | 10,000 | 8,000 | 2,400 | 1,600 | 7,000 | 2,000 | solid | solid | 1,900 | 28,000 |
|  |  | @ 80° C. | 4,000 | 3,000 | 1,000 | 400 | 2,000 | 800 | 5,000 | 6,000 | 440 | 5,000 |
|  | Hardness (JIS A) |  | 95 | 95 | 95 | 95 | 95 | 95 | 95 | 95 | 95 | 95 |
|  | Tensile testing breaking strength (mPa) | Mean value | 41.4 | 46.0 | 38.4 | 38.7 | 37.2 | 39.7 | 35.1 | 36.9 | 30.8 | 42.8 |
|  |  | SD | 2.2 | 2.0 | 1.0 | 1.2 | 1.7 | 1.2 | 3.6 | 5.7 | 1.1 | 3.2 |

As shown in Table 3, the shoe press belts according to Examples 1-6 have suppressed variation in strength among their parts and further were better in strength as compared to the shoe press belts according to Comparative Examples 1-3. In particular, in Examples 1 and 2, in which only certain polycarbonate diol was combined as the polyol compound in the prepolymer, the strength of the shoe press belt was improved as compared to other Examples. Furthermore, in Examples 3, 4 and 6, in which certain polycarbonate diol was combined in the curing agent, the variation in strength among the parts of the shoe press belt was further suppressed as compared to other Examples.

Moreover, the shoe press belt according to Comparative Example 4 in which a linear aliphatic polycarbonate diol was used was excellent in strength though it had large variation in strength among the parts. Because of this, the shoe press belt of Comparative Example 4 is likely to be broken, starting from a part with weak strength. That is, the durability of the shoe press belt was failed to be improved.

REFERENCE SIGNS LIST

1, 1A Shoe press belt
10 Reinforcing fibrous substrate layer
11 Reinforcing fibrous substrate
13 Resin
20, 20A First resin layer
21 Outer circumferential surface
23 Resin
25 Drains
30 Second resin layer
31 Inner circumferential surface
33 Resin

What is claimed is:

1. A shoe press belt, comprising at least one resin layer comprising a polyurethane resin, wherein:
the polyurethane resin comprises as a component (a) at least one polycarbonate diol comprising at least one unit A of the following formula (1):

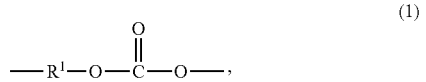
(1)

wherein $R^1$ is a branched alkylene group having from 3 to 20 carbon atoms, and at least one unit B of the following formula (2):

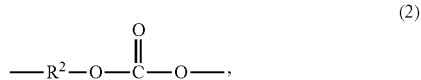
(2)

wherein $R^2$ is a linear alkylene group having from 1 to 20 carbon atoms.

2. The shoe press belt according to claim 1, wherein $R^1$ is selected from the group consisting of 3-methylpentylene group, 2,2-dimethylpropylene group, 2-methyloctylene group, 2-butyl-2-ethylpropylene group and 2,2,4-trimethyl-1,6-hexylene group.

3. The shoe press belt according to claim 1, wherein $R^2$ is selected from the group consisting of n-butylene group, n-hexylene group, n-nonylene group, n-decylene group, n-undecylene group and n-dodecylene group.

4. The shoe press belt according to claim 1, wherein the polyurethane resin is obtained by reacting an urethane prepolymer having an isocyanate group and comprising as the component the at least one polycarbonate diol with a curing agent having an active hydrogen group.

5. The shoe press belt according to claim 4, wherein the urethane prepolymer is obtained by reacting a polyisocyanate compound comprising at least one selected from p-phenylene-diisocyanate, 4,4'-methylene bis(phenyl isocyanate), 1,4-bis(isocyanate methyl)cyclohexane, 2,4-tolylene-diisocyanate and 2,6-tolylene-diisocyanate with a polyol compound comprising the at least one polycarbonate diol.

6. The shoe press belt according to claim 5, wherein the polyol compound further comprises polytetramethylene ether glycol, polyhexamethylene carbonate diol, or a combination thereof.

7. The shoe press belt according to claim 4, wherein the curing agent comprises the at least one polycarbonate diol.

8. The shoe press belt according to claim 1, wherein the polyurethane resin is obtained by reacting an urethane prepolymer having an isocyanate group with a curing agent having an active hydrogen group and comprising the at least one polycarbonate diol.

9. The shoe press belt according to claim 8, wherein the curing agent further comprises an alkylene glycol compound, dimethylthiotoluene diamine, diethyltoluene diamine, or a combination thereof.

10. The shoe press belt according to claim 8, wherein the curing agent comprises 1,4-butanediol, dimethylthiotoluene diamine, diethyltoluene diamine, or a combination thereof.

11. The shoe press belt according to claim 8, wherein the urethane prepolymer is obtained by reacting a polyisocyanate compound with a polyol compound comprising a polyether polyol compound, linear aliphatic polycarbonate diol, or a combination thereof.

12. The shoe press belt according to claim 1, having as the resin layer a first layer which constitutes an outer circumferential surface of the shoe press belt, wherein the first layer comprises the polyurethane resin.

13. The shoe press belt according to claim 1, having as the resin layer a second layer which constitutes an inner circumferential surface of the shoe press belt, wherein the second layer comprises the polyurethane resin.

14. A method for producing a shoe press belt, the method comprising:

forming a resin layer comprising a polyurethane resin by curing a polyurethane ingredient, wherein the polyurethane ingredient comprises as a component (a) at least one polycarbonate diol comprising at least one unit A of the following formula (1):

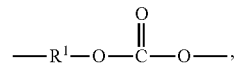  (1)

wherein $R^1$ is a branched alkylene group having from 3 to 20 carbon atoms, and at least one unit B of the following formula (2):

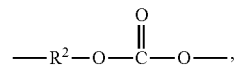  (2)

wherein $R^2$ is a linear alkylene group having from 1 to 20 carbon atoms.

15. The shoe press belt according to claim 4, wherein the curing agent having an active hydrogen group consists essentially of at least one polyol compound.

16. The shoe press belt according to claim 8, wherein the curing agent having an active hydrogen group consists essentially of at least one polyol compound.

* * * * *